(12) United States Patent
Lee et al.

(10) Patent No.: US 7,523,201 B2
(45) Date of Patent: Apr. 21, 2009

(54) SYSTEM AND METHOD FOR OPTIMIZED LUN MASKING

(75) Inventors: Herman Lee, Mountain View, CA (US); Mohan Srinivasan, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 802 days.

(21) Appl. No.: 10/619,122

(22) Filed: Jul. 14, 2003

(65) Prior Publication Data

US 2007/0061454 A1  Mar. 15, 2007

(51) Int. Cl.
G06F 15/173 (2006.01)
G06F 12/10 (2006.01)

(52) U.S. Cl. .................. 709/225; 709/215; 709/212; 711/203; 711/114; 711/202; 711/112; 707/2

(58) Field of Classification Search ............... 709/203, 709/225, 215, 212; 710/8, 62, 170; 711/170; 370/381, 428

See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,138,126 A | 10/2000 | Hitz et al. | |
| 6,289,356 B1 | 9/2001 | Hitz et al. | |
| 6,425,035 B2 | 7/2002 | Hoese et al. | |
| 6,446,141 B1* | 9/2002 | Nolan et al. | 710/8 |
| 6,977,927 B1* | 12/2005 | Bates et al. | 370/381 |
| 7,003,642 B2* | 2/2006 | Dawkins et al. | 711/164 |
| 2002/0112022 A1 | 8/2002 | Kazar et al. | |
| 2002/0116593 A1 | 8/2002 | Kazar et al. | |
| 2003/0131182 A1* | 7/2003 | Kumar et al. | 711/5 |
| 2003/0172149 A1* | 9/2003 | Edsall et al. | 709/224 |

OTHER PUBLICATIONS

Maintenance Procedures ND (8C) nd-network disk control Feb. 1985.

Misc. Reference Manual Pages ND (4P) nd-network disk driver Jul. 26, 1985.

(Continued)

*Primary Examiner*—Jude J Jean Gilles
(74) *Attorney, Agent, or Firm*—Cesari and McKenna, LLP (57) ABSTRACT

A system and method for optimizing lun masking of a storage appliance is provided. Upon login, an initiator data structure containing a lun map is created and associated with each initiator connected to the storage system. When an initiator sends a message directed to a lun associated with the storage system, the storage system maps the lun sent by the initiator to a physical lun associated with the storage system using the lun map. If the lun map contains an appropriate entry, then the lun has been successfully exported and/or masked to the given initiator.

32 Claims, 7 Drawing Sheets

OTHER PUBLICATIONS

Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.
David Hitz et al. TR3002 File System Design for a NFS File Server Appliance published by Network Appliance, Inc.
Fielding et al. (1999) Request for Comments (RFC) 2616, HTTP/1.1.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

| VLUN | PLUN |
|------|------|
| 0 | 4096 |
| 1 | 5000 |
| 2 | |
| ⋮ | ⋮ |

SYSTEM AND METHOD FOR OPTIMIZED LUN MASKING

FIELD OF THE INVENTION

The present invention relates to storage systems and, in particular, to storage systems utilizing lun masking.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including a storage operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level access to files and file systems. Storage of information on a NAS system is typically deployed over a computer network comprising a geographically distributed collection of interconnected communication links, such as Ethernet, that allow clients to remotely access the information (files) stored on the file server. The clients typically communicate with the filer by exchanging discrete frames or packets of data according to pre-defined protocols, such as the well-known Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the well-known Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

Conversely, a SAN is a high-speed network that enables establishment of direct connections between a storage system and its storage devices. The SAN may thus be viewed as an extension to a storage bus and, as such, a storage operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

In a SAN environment, a storage system exports a number of logical unit numbers (lun) to its clients. Each of the clients of a storage system may not have permission to access all of the luns exported by a given storage system. In such a case, the storage system utilizes a lun masking technique so that only the luns that are accessible by the client are visible to that client. To accomplish this lun masking, the storage system maintains a table identifying each client of the storage system and the set of luns that it may access. When a client issues a command addressed to a given lun, the storage system then first determines whether that client has the requisite permission to access the specified lun.

In a typical storage system, each lun will have associated with it a list of client identifiers that may access the given lun. In a Fibre Channel or iSCSI network configuration, the client identifier is typically a world wide name (WWN) embodied as a Node Name. Thus, each time a client (or SCSI initiator) issues a command directed to a lun serviced by a storage system, the storage system examines a listing of associated client identifiers to determine if the requesting client may perform the operation and access the specified lun. If the requesting client may not access the specified lun, then the storage system returns an error message, using conventional SCSI protocol operations, to the requesting client. Otherwise, the client may access the specific lun. A noted disadvantage of such systems is that the storage system must first locate the data structure associated with the specified lun, which is often contained in a linked list. After locating the data structure, typically by stepping through the linked list, the storage system must then identifies whether the client has access to the specified lun, typically by examining a list of client WWNs stored in the lun data structure. This conventional method introduces a high processing overhead to each command issued to a lun associated with a storage system utilizing lun masking.

Another noted disadvantage of conventional lun masking techniques is that each lun associated with a storage system is exported using a lun value associated with the storage system. As a storage system typically serves many more luns then a given client may access, the lun values (numbers) may become quite large. Certain clients, for example those executing older operating systems or drivers, may not be capable of accessing lun values (numbers) higher than seven, i.e., they may only access lun values 0-7. Thus, these clients may be incompatible with a given storage system configuration.

SUMMARY OF THE INVENTION

The present invention overcomes the disadvantages of the prior art by providing a system and method for optimizing lun masking in a network storage system. The system and method utilize a lun map that maps a virtual or client-specific lun to a physical lun connected to a storage system. This lun map is initially generated when the client first logs into the storage system. By utilizing this generated lun map, the storage system may quickly compare a client's requested lun value with the lun map to identify the actual physical lun to perform the operation thereon. Additionally, the present invention permits lun values to be assigned by a client-specific method, thereby enabling a storage system to export luns to systems that may not be capable of accessing certain values of lun numbers.

In one embodiment of the present invention, the storage system, upon receipt of a command issued by a client and directed to a lun served by the storage system, accesses the lun map associated with the given SCSI initiator. The storage system uses the lun map to map the client-specific virtual lun to a physical lun. If this mapping succeeds, then the client may access the given lun and the storage system performs the requested command directed to the given lun. If the lun mapping does not succeed, then the client is attempting to access a lun that it is does not have the appropriate permissions to access.

By utilizing the teachings of the present invention, the number of data look up operations that must be performed in a lun masking operation is reduced, thereby improving system performance and speed.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Multi-Protocol Storage Appliance Environment

Figure 1:
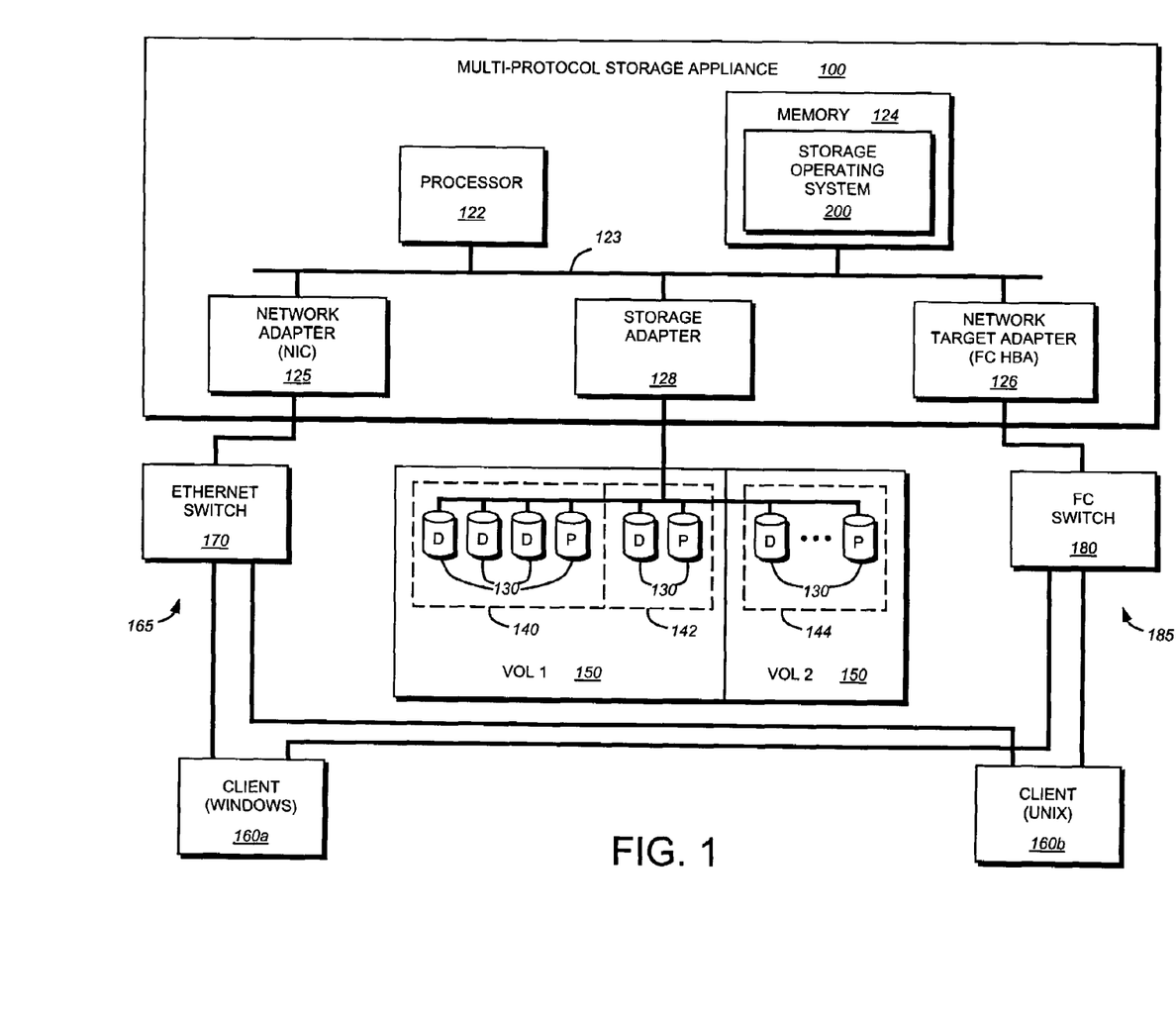
FIG. 1 is a schematic block diagram of a storage system environment in accordance with an embodiment of the present invention.

FIG. 1 is a schematic block diagram of a multi-protocol storage system 100 configured to provide storage service relating to the organization of information on storage devices, such as disks 130. The storage system 100 is illustratively embodied as a storage appliance comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory implementations, including various computer readable media, may be used for storing and executing program instructions pertaining to the inventive system and method described herein.

The network adapter 125 couples the storage appliance to a plurality of clients 160*a,b* over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160*a* running the Windows operating system may communicate with the storage appliance 100 using the Common Internet File System (CIFS) protocol. On the other hand, a client 160*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload Fibre Channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a Node Name or a Port Name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 130, the storage operating system 200 implements a write-anywhere file system as part of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file system based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes is described in U.S. Pat. No. 7,107,385, entitled STORAGE VIRTUALIZATION BY LAYERING VDISKS ON A FILE SYSTEM, by Vijayan Rajan, et al., issued Sep. 12, 2006, the contents of which are hereby incorporated by reference.

In the illustrative embodiment, the storage operating system is preferably the NetApp® Data ONTAP™ operating system available from Network Appliance, Inc., of Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
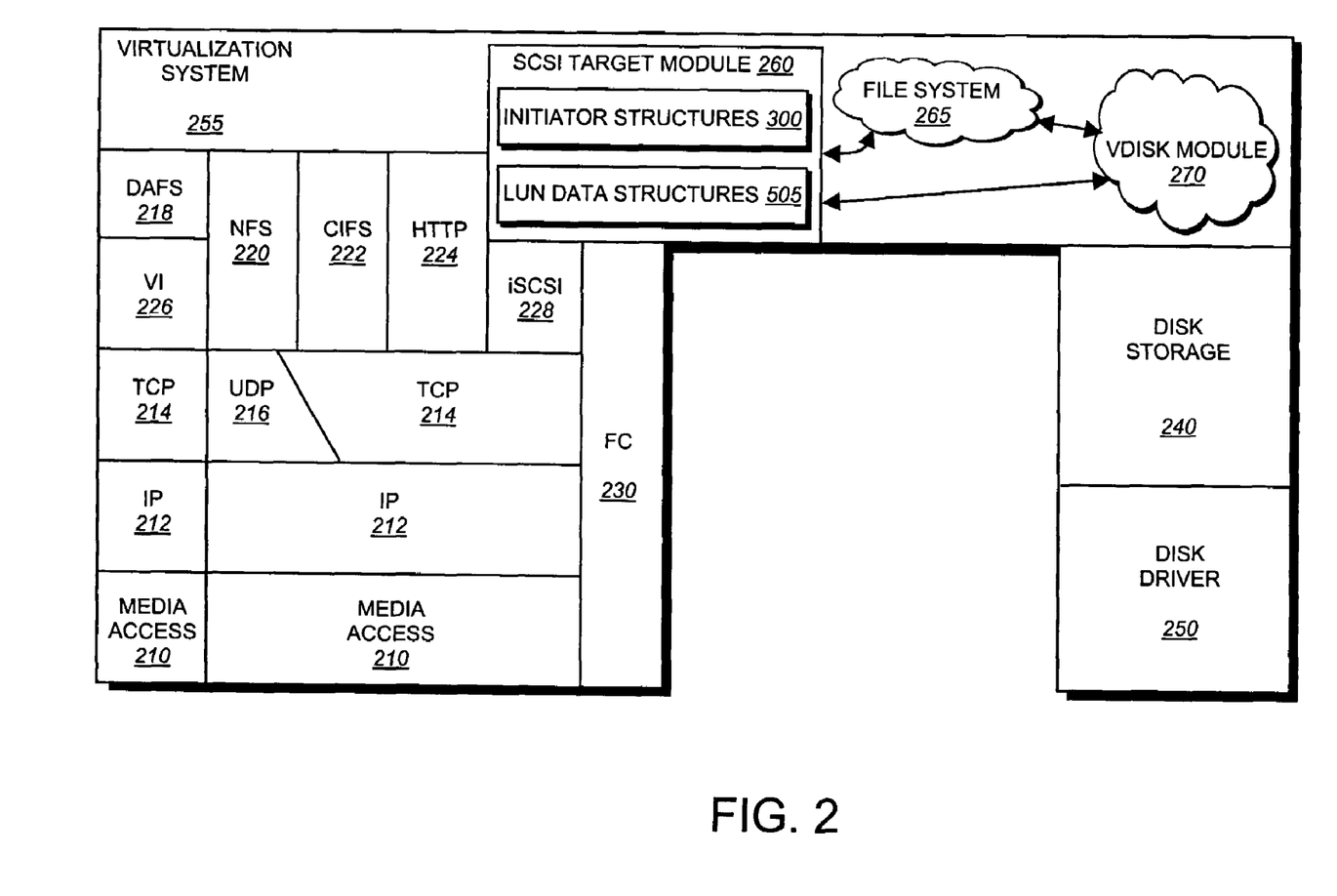
FIG. 2 is a schematic block diagram of an exemplary storage operating system for use with a storage system in accordance with an illustrative embodiment of the present invention.

FIG. 2 is a schematic block diagram of an exemplary storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof. The vdisk module 270 interacts with the file system 265 to provide a data path from the block-based SCSI target module to blocks managed by the file system. In essence, the vdisk module 270 manages SAN deployments by, among other things, implementing a comprehensive set of vdisk (lun) commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the iSCSI and FC drivers 228, 230 and the file system 265 to thereby provide a translation layer of the virtualization system 255 between the SAN block (lun) space and the file system space, where luns are represented as vdisks. By "disposing" SAN virtualization over the file system 320, the multi-protocol storage appliance reverses the approaches taken by prior systems to thereby provide a single unified storage platform for essentially all storage access protocols.

The SCSI target module 260 also implements, in the illustrative embodiment, the novel LUN masking technique, described further below. Additionally, the SCSI target module 260 includes a set of initiator data structures 300 and a set of lun data structures 505. These data structures, described further below, store various configuration and tracking data utilized by the storage operating system for use with each initiator (client) and lun (vdisk) associated with the storage system.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 265 provides functions normally associated with a volume manager. The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Figure 3:
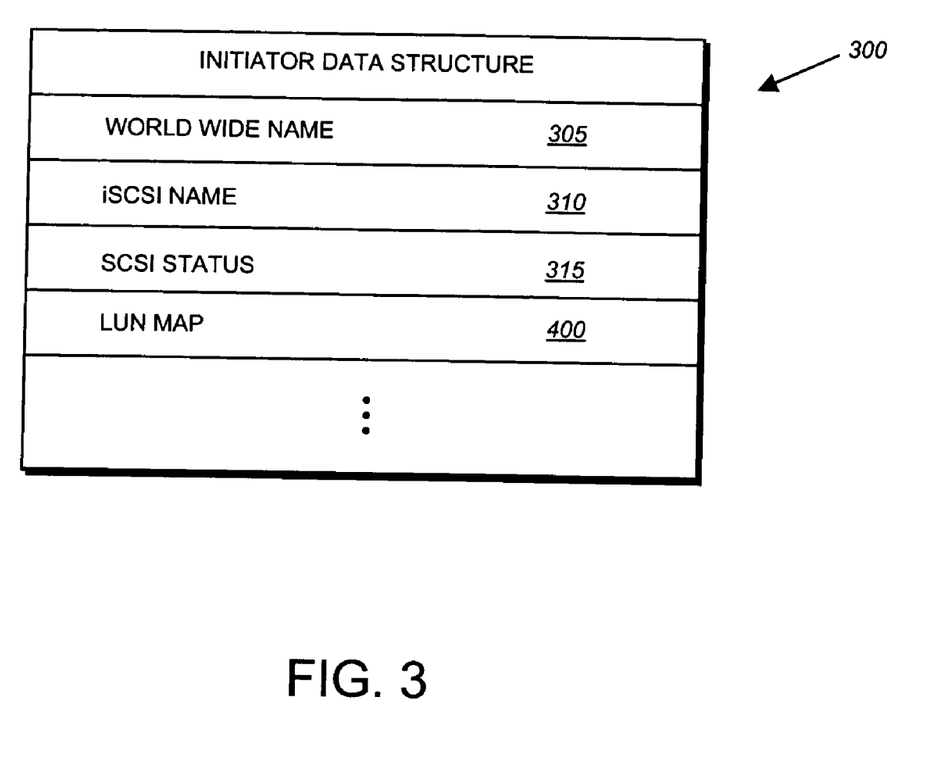
FIG. 3 is a schematic block diagram of an exemplary initiator data structure in accordance with an embodiment of the present invention.
Figure 4:
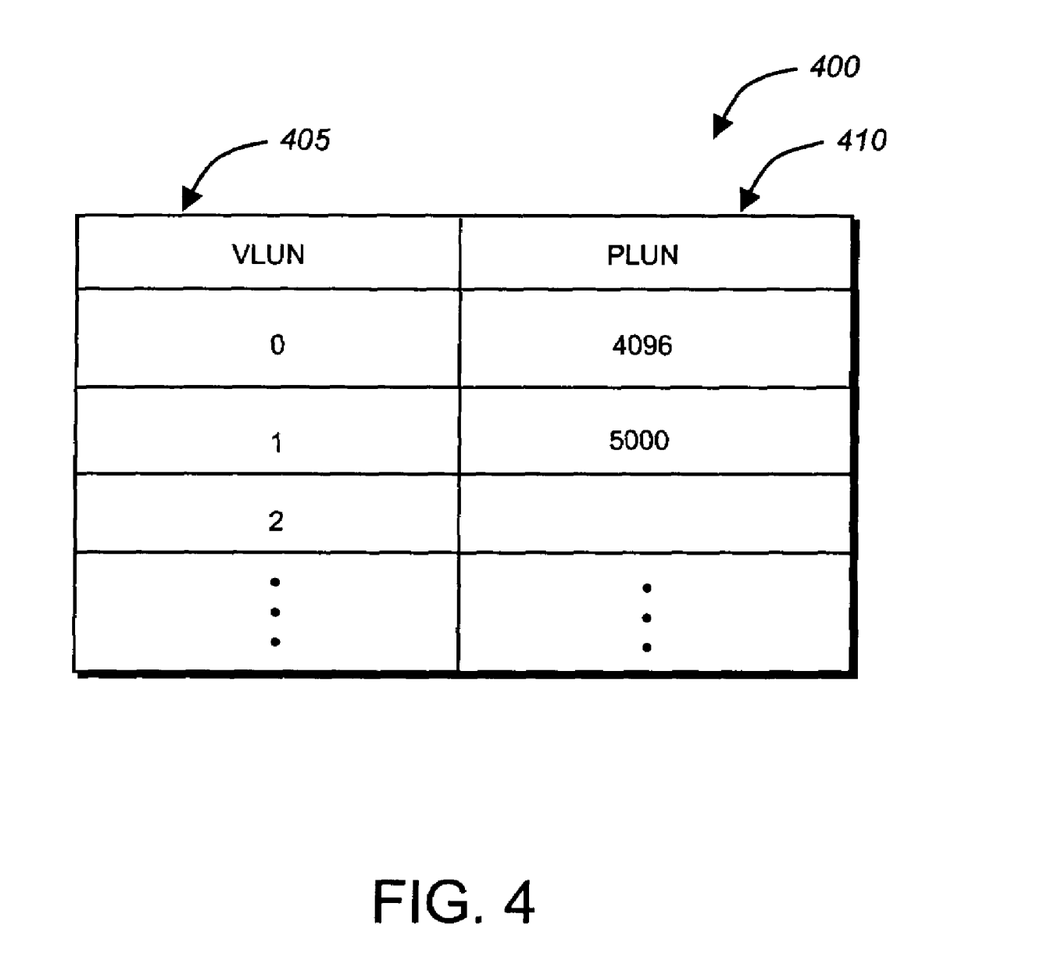
FIG. 4 is a schematic block diagram of an exemplary lun map in accordance with an embodiment of the present invention.

The SCSI target module 260 illustratively includes a set of initiator data structures 300 as shown in FIG. 3. The initiator data structure 300 is, in the illustrative embodiment, created when a new initiator first connects to the storage appliance. Thus, each initiator data structure is associated with a SCSI initiator (i.e., a client of the storage appliance). The storage appliance illustratively populates the various fields with data obtained during the connection stage. The initiator data structure 300 includes various fields including, such as, a world wide name field 305, an iSCSI name 310, a SCSI status field 315 and a lun map 400. It should be noted that in alternate embodiments the initiator data structure 300 may have varying and/or differing fields from the illustrative embodiment. The world wide name field 305 contains the WWN associated with the initiator. Similarly, the iSCSI name 310 contains the iSCSI name of the initiator. The SCSI status field 315 contains various status information concerning the initiator's SCSI connection. The lun map 400 contains a mapping of virtual luns (VLUNs) to physical lun (PLUNs). In the illustrative embodiment, the lun map 400 is generated along with the initiator data structure 300 when a client initially logs into the storage system.

An exemplary lun map 400, shown in FIG. 4, maps virtual luns (VLUN) to physical luns (PLUNs). A VLUN is a lun returned to a given SCSI initiator in a storage system environment. An initiator may be assigned a set of VLUNs starting from zero and progressing up to the number of luns that the initiator is connected thereto. Conversely, a PLUN is an actual lun associated with a vdisk managed by the storage appliance. As the storage appliance is an intermediary between clients and vdisks, it typically manages a larger set of luns than that visible to a given client. The lun map 400 has, in the exemplary embodiment, two columns. The first column, VLUN 405 identifies the virtual logical unit number that a given SCSI initiator is accessing. In one embodiment of the present invention, each SCSI initiator attached to the storage appliance has its own lun address space. The second column is comprised of PLUNs 410 that are mapped to a corresponding VLUNs 405. Thus, in the example shown in FIG. 4, VLUN 0 is mapped to PLUN 4096. Similarly VLUN 1 is mapped to PLUN 5000. The use of this VLUN to PLUN mapping enables each SCSI initiator to address a given device with an initiator-specific lun value, i.e. a VLUN. If a given lun value is not exported to a given client, the PLUN value associated with the VLUN entry in the lun map 400 will be empty. For example, in the exemplary lun map 400 shown in FIG. 4, VLUN number 2 is not mapped to any PLUN value. Thus, any data access request directed to VLUN value 2 by this client will result in an error. The storage appliance utilizes the LUN map 400 to translate a given VLUN from a SCSI initiator to the appropriate PLUN attached to the storage appliance.

Figure 5:
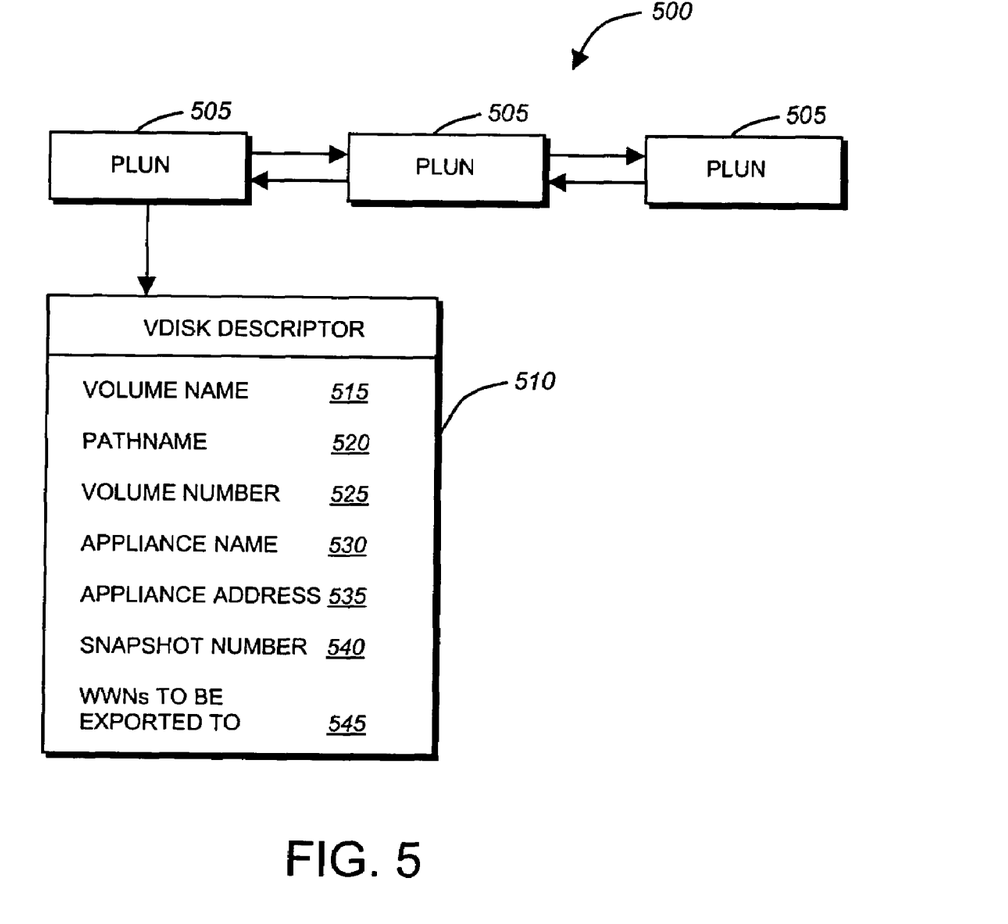
FIG. 5 is a schematic block diagram of an exemplary linked list of lun data blocks in accordance with an embodiment of the present invention.

FIG. 5 shows an exemplary set 500 of linked lun data structures ("objects") 505 maintained by the SCSI target module. Each lun data descriptor object 505 contains various data associated with a given vdisk embodied as that PLUN. This information is used by the storage appliance for management of the given vdisk. Each lun data descriptor object 505 also, illustratively, includes a vdisk descriptor 510.

Each vdisk (lun) managed by a storage appliance has an associated vdisk descriptor 510 that includes various data fields for information pertaining to the vdisk. These fields include volume name 515, path name 520, volume number 525, appliance name 530, appliance address 535, snapshot number 540 and a list of WWNs 545 that the lun is to be exported to. It should be noted that the fields described herein are exemplary only in that additional and/or differing fields may be utilized in accordance with various embodiments of the invention. For example, the volume name 515 field identifies the volume containing the vdisk. The path name field 520 describes a path on the volume identified in the volume name 515 field to the file containing the vdisk. Thus if the appliance name stored in field 530 is "Appliance5", the volume name stored in field 515 is "vol0" and the path name stored in field 520 field is "/vdisks/vdisk," then the vdisk identified by this vdisk descriptor 510 may be uniquely identified by the fully qualified path "Appliance5:/vol0/vdisks/vdisk." The list of WWNs 545 stores the WWNs of clients that the lun is to be exported to and that may access the given lun. The list of WWNs 545 may be set by an administrator when the vdisk is initially created.

C. Optimized Lun Masking

In accordance with the illustrative embodiment of the present invention, each of the initiator data structures 300 includes a lun map 400 that is generated when the initiator first logs into the storage system. In the illustrative embodiment, this lun map is then utilized to perform the lun masking function of only enabling clients who are permitted to access a given lun to have access to that specified lun. The use of the lun map within an initiator data structure 300 improves system performance.

Figure 6:
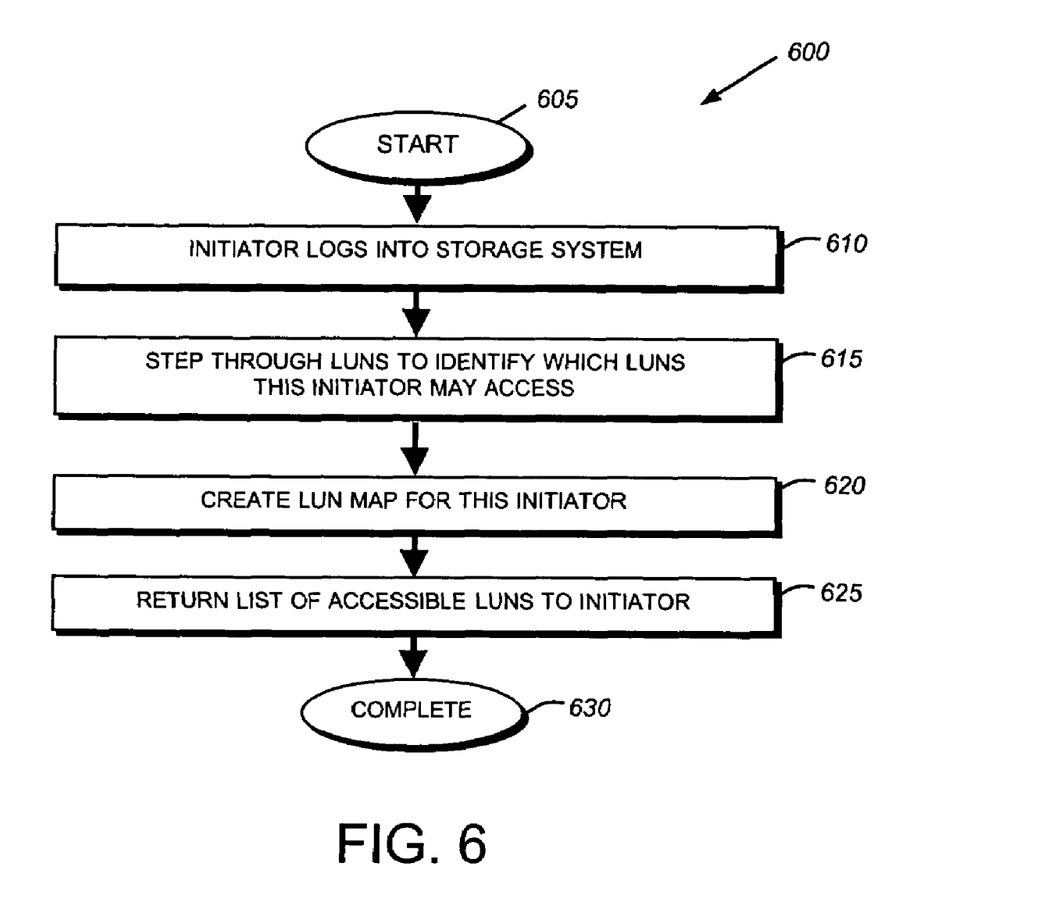
FIG. 6 is a flow chart detailing the steps of a procedure performed for creating a lun map in accordance with an embodiment of the present invention.

The steps of an exemplary procedure 600 performed by the storage system for creating a lun map in accordance with an embodiment of the present invention is shown in FIG. 6. The procedure 600 initially begins in step 605 and then proceeds to step 610 where the initiator logs into the storage system. This login may be accomplished by using conventional SCSI protocol commands. Once the initiator has logged into the storage system, the storage system then, in step 615, walks through each of the linked lun data structures 505 associated with the storage system to identify the PLUNs that this initiator may access. This may be accomplished, by example, by searching for the initiator's WWN in the list of WWNs to be exported field 545 of each of the lun descriptor objects 505. After the list of PLUNs that are accessible to the initiator has been identified, the procedure, in step 620, then creates a lun map 400 for this initiator that associates those PLUNs to VLUNs and incorporates the map into the initiator data structure associated with the initiator. That is, the lun map will identify the mappings of the virtual luns to be exported to the initiator to the physical luns associated with the storage system. Once the lun map has been generated, in step 620, the procedure then returns a list of accessible VLUNs to the initiator in accordance with the conventional SCSI protocol (step 625). At this point the initiator has successfully logged into the storage system and the procedure is complete (step 630).

Once the initiator has been logged into the storage system, it may issue SCSI commands to any of the VLUNs that have been exported to it. Upon receipt of one of these SCSI commands, the storage system first must determine if the initiator is permitted to access the lun identified in the SCSI command. This lun masking ensures that only those initiators with the proper security permissions may access the data stored on a given lun.

Figure 7:
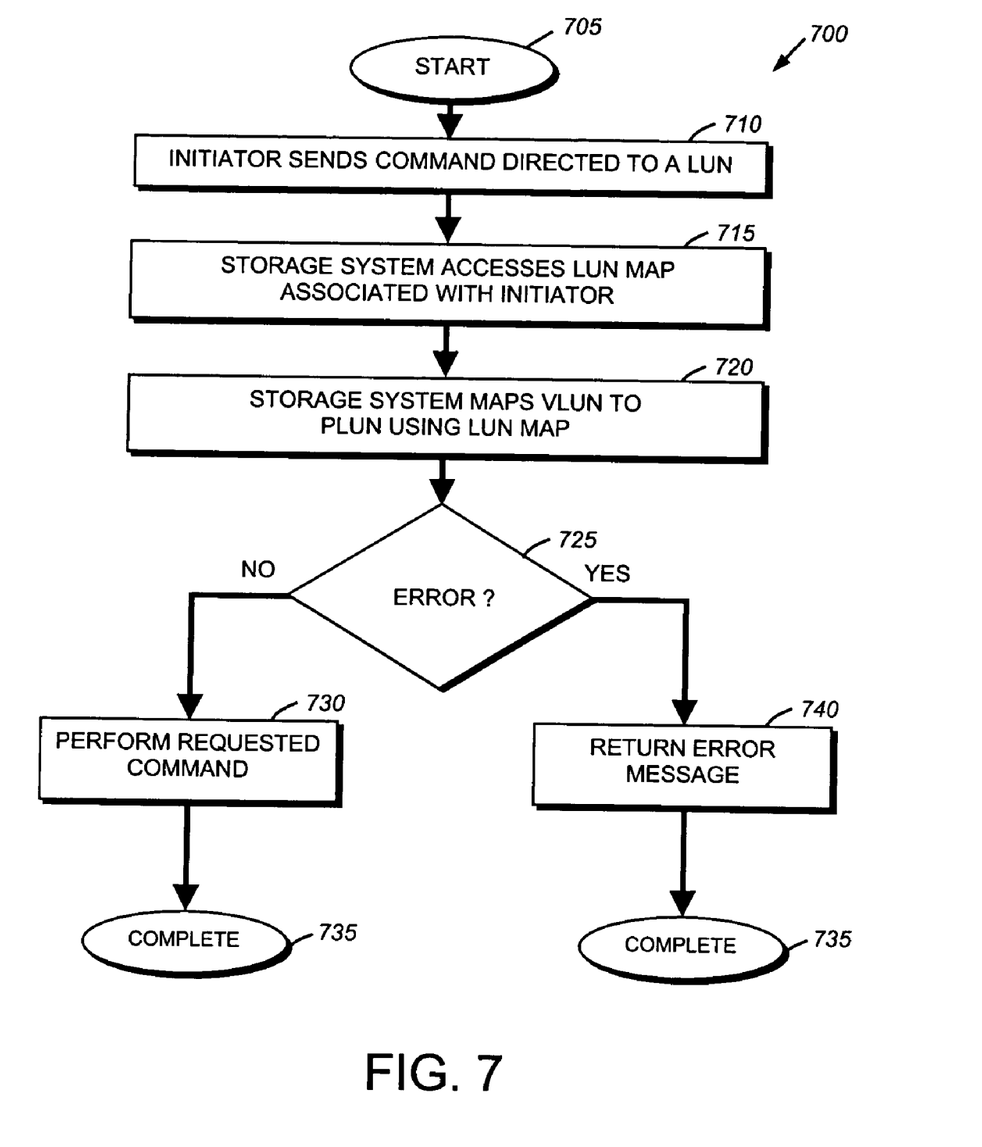
FIG. 7 is a flow chart detailing the steps of a procedure for processing a command directed to a lun by a client in accordance with an embodiment of the present invention.

The steps of an illustrative procedure 700 for performing an optimized lun masking routine are shown in FIG. 7. The procedure 700 starts in step 705 and then proceeds to step 710 where an initiator sends a command directed to a lun associated with a given storage system. The initiator will use a lun value associated with its VLUN value that represents the desired lun/vdisk. The storage system then accesses the lun map 400 associated with the initiator in step 715. In the illustrative embodiment, this lun map 400 will be located within the initiator data block 300 that is associated with the given initiator. Then, in step 720, the storage system maps the VLUN to a PLUN using the lun map. The storage system then checks, in step 725, whether an error occurred during the mapping process. If no error occurred, then the procedure performs the requested command directed to the lun identified in the PLUN entry associated with the VLUN received from the initiator. Once the command has been requested, the procedure is then complete in step 735. If, however, an error has occurred in step 725, the procedure then branches to step 740 where an error message is returned. After the error message has been returned, the procedure is then complete (step 735).

Examples of an error condition that could occur would be if, for example, the initiator attempts to access a VLUN that is not mapped to a PLUN on the storage system. For example, lun number may not be exported to a given client. For example, in the lun map 400 shown in FIG. 4, the VLUN value 2 is not exported to a client as there is not corresponding PLUN value within the lun map 400. In such a situation, an attempt by the initiator to access lun number 2 will result in an error message being returned. By utilizing the above-described lun masking technique, the storage system only needs to perform a single lookup of data, namely identifying the VLUN sent by the initiator and its associated PLUN in the lun map.

To again summarize, the system and method provides a novel way of optimizing lun masking techniques for use by a storage system in a networked environment. Upon the initial login of a given initiator, the storage system generates an initiator data structure containing a lun map that associates a virtual lun number that is exported to the client with a physical lun associated with the storage system. This lun map may be generated, in the illustrative embodiment, by traversing a linked list of lun data structures and comparing an initiator's identification with a list of identification values to which the lun is to be exported.

When an initiator sends a SCSI command to the storage system directed at a lun, the system must determine if the initiator may access that given lun. In the illustrative embodiment, the storage system accesses the lun map associated with the given initiator to map the lun value sent by the initiator (i.e., a vlun value) to physical lun associated with the storage system. If this mapping occurs successfully, then the storage system will grant access to the initiator. By utilizing an initiator-specific lun map, the number and forms of data lookups to complete a lun masking operation is reduced, thereby improving system performance and speed.

The foregoing description has been directed to specific embodiments of this invention. It will be apparent, however, that other variations and modifications may be made to the described embodiments, with the attainment of some or all of their advantages. Specifically, it should be noted that any number of NIC/HBAs may be utilized in accordance with the invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for accessing a data storage system, comprising:
    receiving a login request from a first specific client, the login request directed to the data storage system;
    generating, in response to the login request, a first logical unit number map (lun map) for the specific client by determining one or more physical logical unit numbers (PLUNs) of the data storage system that the first specific client has permission to access and then mapping one or more client specific virtual logical unit numbers (VLUNs) of the first specific client to the one or more PLUNs, in the first lun map;
    exporting the client specific VLUNs to the first specific client; and
    receiving a data access request command from the first specific client, the request directed to a selected client specific VLUN in the first lun map, and translating the client specific VLUN into a selected PLUN utilizing the first lun map, and performing the data access request command on the selected PLUN associated with the data storage system.

2. The method of claim 1, further comprising:
generating the first lun map to have a set of ordered pairs mapping the one or more client specific VLUNs to one or more PLUNs.

3. The method of claim 1, further comprising:
identifying the one or more PLUNs that the client may access in response to the client logging in by,
(a) selecting a lun data structure;
(b) searching through a list of client identifiers in the lun data structure to identify whether the client may access the one or more PLUNs;
repeating steps (a) and (b) for each lun data object associated with a given storage system; and
accessing, in response to a client data access request, a lun data object by use of the first lun map and without searching the lun data structure.

4. The method of claim 1, further comprising:
accessing a set of lun data structures associated with the storage system in identifying the one or more PLUNs which the client has permission to access.

5. The method of claim 3, further comprising:
using a world wide name as the client identifier.

6. The method of claim 1, further comprising:
using a Fibre Channel switching network for the first specific client to access the data storage system.

7. The method of claim 1, further comprising:
using an Ethernet switching network for the first specific client to access the data storage system.

8. The method of claim 1, further comprising:
using a multi-protocol storage appliance as the data storage system.

9. The method of claim 1, further comprising:
exporting the client specific VLUNs to the client as a set of accessible luns.

10. The method of claim 1, further comprising:
containing the first lun map within an initiator data structure.

11. A data storage system, comprising:
    a login request received from a specific client, the login request directed to the data storage system;
    a logical unit number map (lun map) generated, in response to the login request, the lun map mapping one or more client specific virtual logical unit numbers (VLUNs) to one or more physical logical unit numbers (PLUNs) of the data storage system that the first specific client has permission to access;
    the client specific VLUNs exported to the client; and
    a data access request command received from the specific client, the request directed to a client specific VLUN in the lun map, translating the client specific VLUN by the map into a selected PLUN, and performing the data access request command on the selected PLUN associated with the data storage system.

12. The data storage system of claim 11, further comprising:
the lun map having a set of ordered pairs mapping the one or more client specific VLUNs to the one or more PLUNs.

13. The data storage system of claim 11, further comprising:

one or more PLUNs that the specific client may access identified in response to the specific client logging in by,
(a) selecting a lun data structure;
(b) searching through a list of client identifiers in the lun data structure to identify whether the specific client may access the one or more PLUNs;
repeating steps (a) and (b) for each lun data object associated with a given storage system; and
a client data access request to access a lun data object by use of the lun map and without searching the lun data structure.

14. The data storage system of claim 11, further comprising:
a set of lun data structures associated with the storage system accessed in identifying the one or more PLUNs which the specific client has permission to access.

15. The data storage system of claim 13, further comprising:
a world wide name used as the client identifier.

16. The data storage system of claim 11, further comprising:
a Fibre Channel switching network used for the specific client to access the data storage system.

17. The data storage system of claim 11, further comprising:
an Ethernet switching network used for the specific client to access the data storage system.

18. The data storage system of claim 11, further comprising:
a multi-protocol storage appliance used as the data storage system.

19. The data storage system of claim 11, further comprising:
the one or more client specific VLUNs exported to the client as a set of accessible luns.

20. The data storage system of claim 11, further comprising:
the lun map contained within an initiator data structure.

21. A computer readable storage medium, comprising:
a processor executing instructions for accessing a data storage system, the data storage system having the steps of,
receiving a login request from the specific client, the login request directed to the data storage system;
generating, in response to the login request, a logical unit number map (lun map) for the specific client by determining one or more physical logical unit numbers (PLUNs) of the storage system that the first specific client has permission to access and then mapping one or more client specific virtual logical unit numbers (VLUNs) to the one or more PLUNs;
exporting the client specific VLUNs to the client; and
receiving a data access request command from the client, the request directed to a client specific VLUN, translating the client specific VLUN by the lun map into a selected PLUN utilizing the lun map, and performing the data access request command on the selected PLUN.

22. A method for accessing a data storage system, comprising:
logging into the data storage system by a client;
generating, in response to the client logging into the data storage system, a logical unit number map (lun map) for one or more physical logical units (PLUNs) the client is permitted to access, the lun map excluding mapping of PLUNs the client is not permitted to access, the lun map mapping virtual logical unit numbers (VLUNs) to the one or more PLUNs;
exporting the VLUNs to the client;
receiving a data access request command from the client for data on a specific VLUN mapped by the lun map, the request directed to a client specific VLUN, translating the client specific VLUN by the lun map into a selected PLUN utilizing the lun map, and
performing, by the data storage system, the data access request on the PLUN mapped by the lun map to the specific VLUN.

23. The method of claim 22, further comprising: accessing the PLUNs supporting a client specific virtual logical unit number (VLUN).

24. The method of claim 22, further comprising:
identifying the one or more PLUNs that the client may access in response to the client logging in by,
(a) selecting a lun data structure;
(b) searching through a list of client identifiers in the lun data structure to identify whether the client may access the one or more PLUNs;
repeating steps (a) and (b) for each lun data object associated with a given storage system; and
accessing, in response to a client data access request, a lun data object by use of the lun map and without searching the lun data structure.

25. The method of claim 23, further comprising:
accessing a set of lun data structures associated with the storage system in identifying the one or more PLUNs which the client has permission to access.

26. The method of claim 23, further comprising:
containing the lun map within an initiator data structure.

27. An apparatus to access a data storage system, comprising:
a client configured to log into the data storage system;
in response to the client logging into the data storage system, a client specific logical unit number map (lun map) configured to be generated for one or more physical logical units (PLUNs) the client is permitted to access, the lun map further configured to exclude mapping of PLUNs the client is not permitted to access, the lun map mapping virtual logical unit numbers (VLUNs) to the one or more PLUNs;
the VLUNs further configured to be exported to the client;
the client further configured to send a data access request for data on a specific VLUN mapped by the lun map;
receiving a data access request command from the client for data on a specific VLUN mapped by the lun map, the request directed to a client specific VLUN, translating the client specific VLUN by the lun map into a selected PLUN utilizing the lun map, and
the data storage system configured to perform the data access request on the PLUN mapped by the lun map to the specific VLUN.

28. The system of claim 27, further comprising:
the specific PLUN configured to access a physical logical unit.

29. The system of claim 27, further comprising:
(a) a lun data structure selected in response to the login by the client;
(b) a storage system to search through a list of client identifiers in the lun data structure to identify whether the client may access a selected PLUN, the storage system to repeat steps (a) and (b) for each lun data object associated with a given storage system; and
a lun data object, associated with the selected PLUN, accessed by use of the lun map and without a search of the lun data structure.

30. The system of claim 27, further configured to access a set of lun data structures associated with the storage system by identifying the one or more PLUNS which the client has permission to access.

31. The system of claim 27, further comprising:
the lun map configured within an initiator data structure.

32. A computer readable storage medium, comprising:
a processor executing instructions for the practice of a method of accessing a data storage system, the method having the steps of,
logging into the data storage system by a client;
generating a client specific logical unit number map (lun map), in response to the client logging into the data storage system, for one or more physical logical units (PLUNs) the client is permitted to access, the lun map excluding mapping of PLUNs the client is not permitted to access, the lun map mapping virtual logical unit numbers (VLUNs) to the one or more PLUNs;
exporting the VLUNs to the client;
receiving a data access request command from the client for data on a specific VLUN mapped by the lun map, the request directed to a client specific VLUN, translating the client specific VLUN by the lun map into a selected PLUN utilizing the lun map, and
performing by the data storage system the data access request on the selected PLUN mapped by the lun map to the specific VLUN.

* * * * *